P. F. RYAN.
GRASS SHEARS.
APPLICATION FILED APR. 11, 1913.
1,107,227.
Patented Aug. 11, 1914.
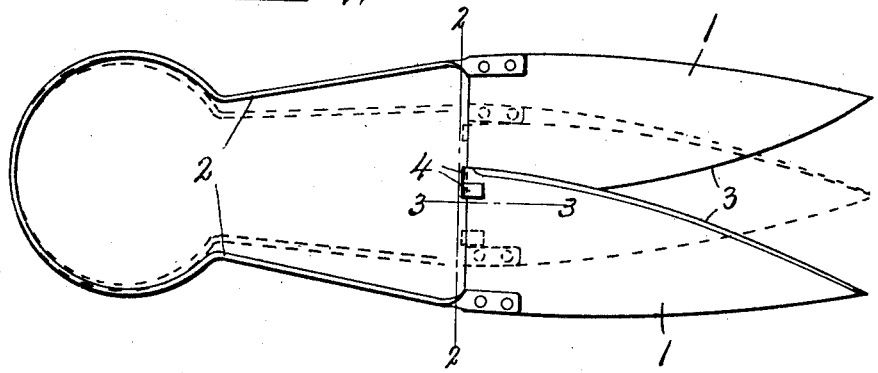
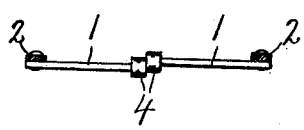
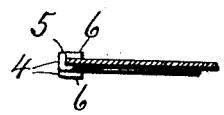
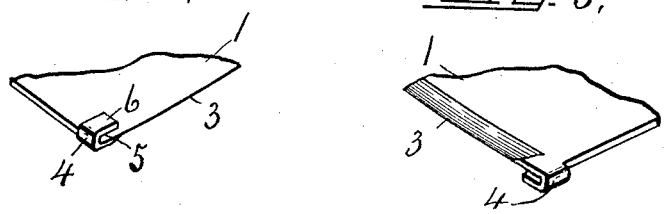
WITNESSES:
INVENTOR.
P. F. Ryan
BY
Howard P. Denison
ATTORNEY.

UNITED STATES PATENT OFFICE.

PATRICK F. RYAN, OF SYRACUSE, NEW YORK.

GRASS-SHEARS.

1,107,227.  Specification of Letters Patent.  Patented Aug. 11, 1914.

Application filed April 11, 1913. Serial No. 760,427.

*To all whom it may concern:*

Be it known that I, PATRICK F. RYAN, of Syracuse, in the county of Onondaga, in the State of New York, have invented new and useful Improvements in Grass-Shears, of which the following, taken in connection with the accompanying drawings, is a full, clear, and exact description.

This invention relates to certain improvements in grass shears and refers more particularly to the means for holding the blades in shearing contact and for limiting their open movement.

The main object is to produce a more effective guide and limiting stop for holding the cutting edges of the blades in shearing contact throughout their entire lengths as the same are closed and at the same time serving the additional purpose of limiting the opening movement of said blades without increasing the number of parts, thereby permitting the entire shears to be manufactured at a much lower cost than would be possible if the guides and stops were made of separate pieces or more intricate in their formation.

Other objects and uses will be brought out in the following description.

In the drawings—Figure 1 is a top plan of grass shears embodying the features of my invention. Fig. 2 is a transverse sectional view of the same shears taken on line 2—2, Fig. 1, showing the ends of the blades and guide stops. Fig. 3 is a detail sectional view taken on line 3—3, Fig. 1. Figs. 4 and 5 are perspective views of the rear ends of the shearing sides of the blades showing the guides and limiting stops.

In order that my invention may be clearly understood, I have shown a pair of shearing blades —1— of sheet steel as mounted upon the ends of a U-shape spring handle —2— and provided with cutting edges —3—, the heels or rear ends of the cutting edges lapping one upon the other while the rear ends of the blades are preferably straight and disposed in substantially the same transverse plane and are provided with integral tongues —4— near their cutting edges. These tongues are stamped from the same piece of metal as their respective blades while the latter are being formed in the blanks and project rearwardly from the rear edges thereof, but are subsequently returned to form guide slots —5— and blade-retaining lips —6—, the tongue of each blade being returned forwardly across the rear edge and outer face of the other blade so that the return bends of both tongues lie in the path of movement of each other to limit the opening movement of the blades. In other words, the tongues are formed integral with the overlapping portions of the rear ends of the blades and are arranged so that the tongue of each blade laps upon the adjacent portion of the other blade some distance from its shearing edge so that when the blades are opened by the action of the spring —2—, the return bends of the tongues will abut one against the other to limit such opening movement, it being understood that the spring is tensioned as shown to open the blades. By extending the tongues forwardly or lengthwise of and upon the outer surfaces of the blades near their cutting edges, it is evident that said cutting edges will be held into close shearing operation and will also serve to limit the opening movement of the blades, thereby assuring a close travel of the cutting edges from their bases to the points without adding any extra parts to the shears, which enables said shears to be manufactured at an extremely low cost without sacrificing the quality of the style or efficiency of the entire shears.

What I claim is:

1. A grass shears comprising a spring handle and a pair of blades secured thereto and having their rear ends provided with integral tongues, the tongue of each blade being bent around the heel and upon the outer surface of the other blade in sliding engagement therewith.

2. A grass shears comprising a pair of shearing blades having the rear ends of their cutting edges lapping one upon the other and the rear ends of the overlapping portions provided with integral tongues, the tongue of each blade being bent around the heel and upon the outer face of the other blade in sliding engagement therewith, said tongues being arranged side by side one in the path of the other to limit the opening movement of the blades.

3. A grass shears comprising a U-shaped spring, shearing blades secured to the ends of the spring and having the heels of their overlapping shearing edges provided with tongues, the tongue of the upper blades being bent around and under the heel of the lower blade and located between the shearing edge and outer edge of said lower blade while the tongue of the lower blade is bent around and over the heel of the upper blade and is located between the shearing edge and outer edge of said upper blade, the tongue of each blade being in sliding engagement with the heel of the other blade.

In witness whereof I have hereunto set my hand this 5th day of April 1913.

PATRICK F. RYAN.

Witnesses:
H. E. CHASE,
EVA E. GREENLEAF.

Copies of this patent may be obtained for five cents each, by addressing the "Commissioner of Patents, Washington, D. C."